United States Patent [19]
Ueno

[11] Patent Number: 6,072,965
[45] Date of Patent: Jun. 6, 2000

[54] IMAGE FORMING APPARATUS AND METHOD UTILIZING AN ATTACHMENT SITUATION OF A PRINTER CONTROLLER

[75] Inventor: Fumihiro Ueno, Mishima, Japan

[73] Assignee: Canon Kabushiki Kaisha, Tokyo, Japan

[21] Appl. No.: 09/203,512

[22] Filed: Dec. 1, 1998

[30] Foreign Application Priority Data

Dec. 2, 1997 [JP] Japan .................................. 9-331772

[51] Int. Cl.⁷ .................................................. G03G 15/01
[52] U.S. Cl. .................................. 399/80; 399/12; 399/13
[58] Field of Search .............................. 399/80, 8, 9, 11, 399/90, 12, 13; 347/19

[56] References Cited

U.S. PATENT DOCUMENTS

| | | | |
|---|---|---|---|
| 4,788,575 | 11/1988 | Ito et al. | 399/13 |
| 5,075,724 | 12/1991 | Wade et al. | 399/12 |
| 5,854,957 | 12/1998 | Morikawa | 399/38 |
| 5,920,749 | 7/1999 | Sugaya et al. | 399/69 |
| 5,953,552 | 9/1999 | Someya | 399/13 |

FOREIGN PATENT DOCUMENTS 6-234258  8/1994  Japan .

*Primary Examiner*—Quana Grainger
*Attorney, Agent, or Firm*—Fitzpatrick, Cella, Harper & Scinto

[57] ABSTRACT

In a multicolor image forming apparatus constructed of a printer controller and a printer engine, such as a laser beam printer, and the like, after confirming the reception of a proper ID command from the printer controller, the printer engine enters a printable state. Before the ID of the printer controller is checked, by checking an attachment situation of the printer controller at the time of turning on of a power supply, and the like, the attachment situation of the printer controller is discriminated. When the printer engine is not attached, the ID check is skipped and only an engine test print by an engine test print switch is enabled.

25 Claims, 9 Drawing Sheets

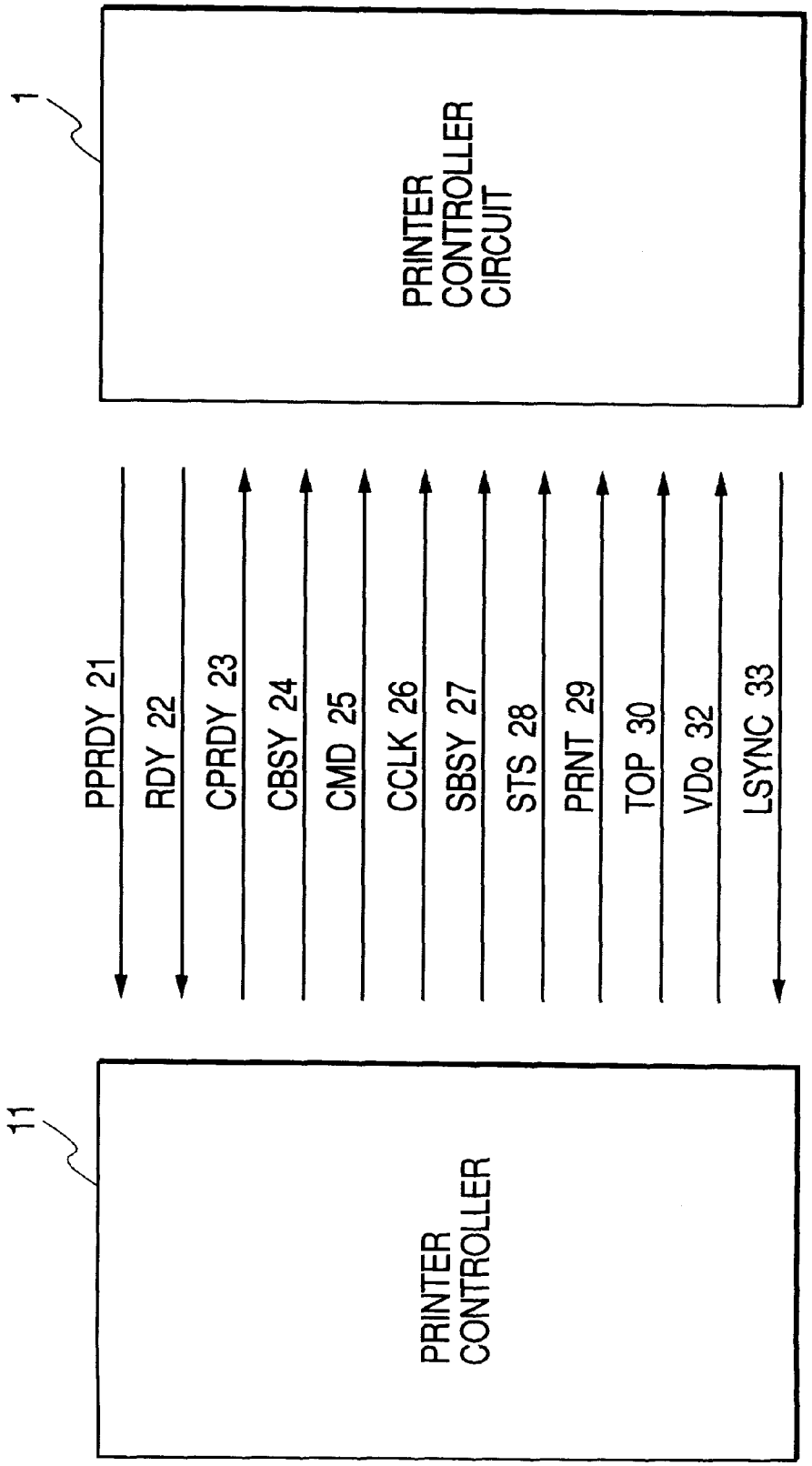

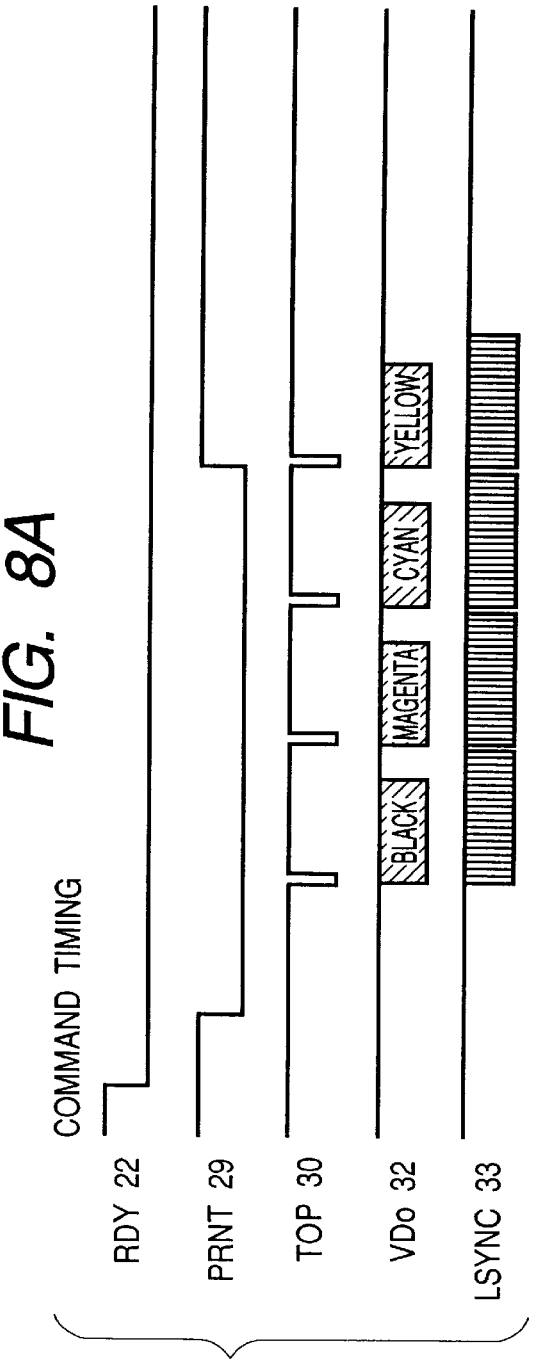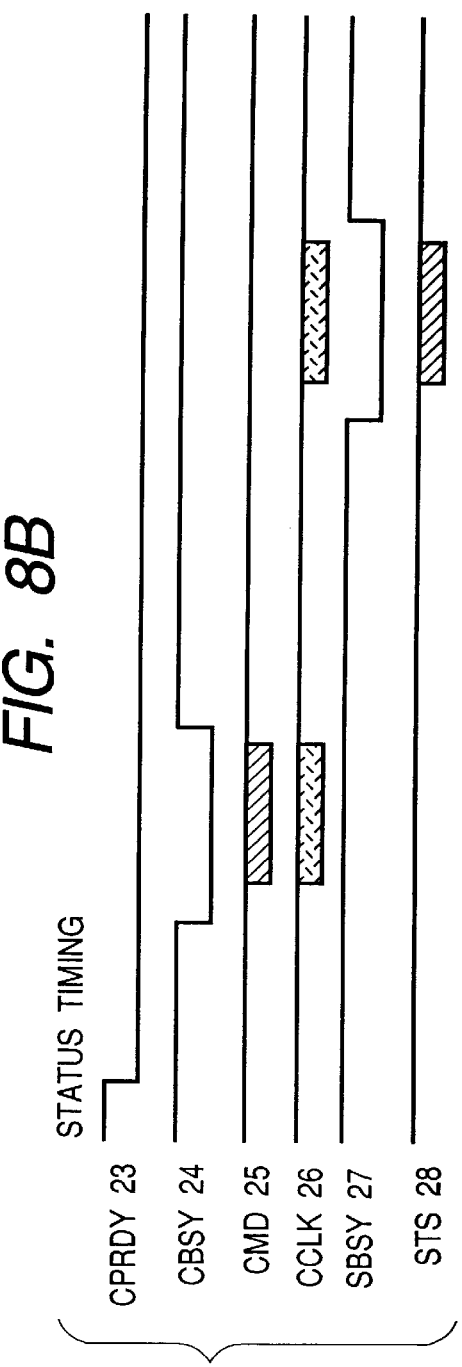

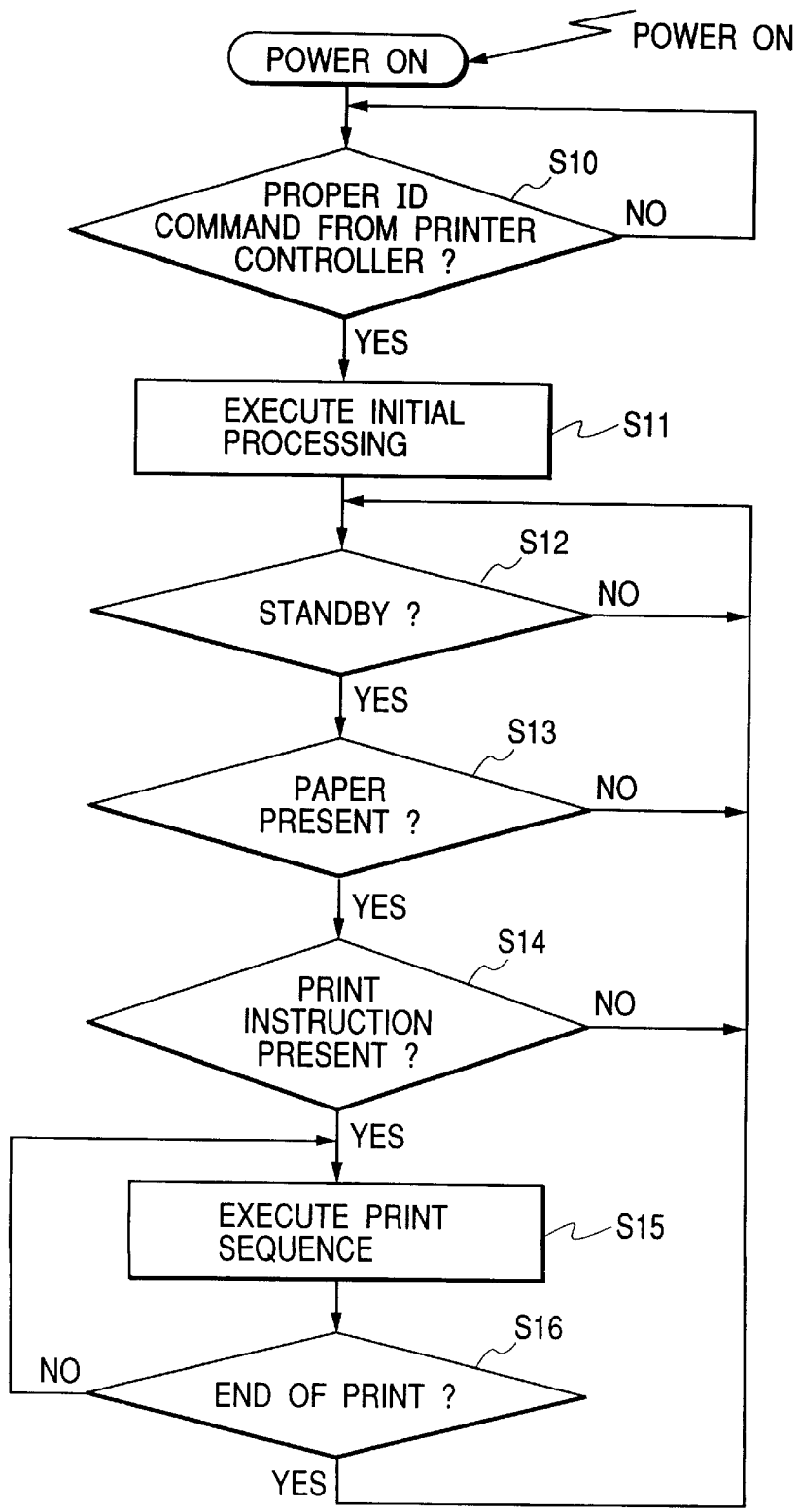

IMAGE FORMING APPARATUS AND METHOD UTILIZING AN ATTACHMENT SITUATION OF A PRINTER CONTROLLER

BACKGROUND OF THE INVENTION

1. Field of the Invention

The invention relates to an image forming apparatus for forming an image by an electrophotographic system.

2. Related Background Art

In such a kind of apparatus, there is a case where when a power supply is turned on, a specific command (ID) is transmitted from a printer controller to a printer engine and the printer engine can operate only when the contents of the command coincide with a predetermined code.

FIG. 6 shows a block diagram for explaining a printer control mechanism of an example of a multicolor image forming apparatus. In FIG. 6, reference numeral 1 denotes a printer controller circuit for forming a video signal (VDo) 3 in an image forming apparatus 2 on the basis of a multicolor image signal from a printer controller 11 and outputting it to a laser driver 4. The laser driver 4 is a circuit for driving a semiconductor laser (not shown) and for generating a laser drive signal 5. An actuator driver 54 outputs an actuator drive signal 55 for a motor, a clutch, a solenoid, and the like, in accordance with a print sequence signal 52 from the image forming apparatus 2 or sensor information.

The image forming apparatus 2 outputs first and second video signals formed from the multicolor image signal, forms first and second electrostatic latent images onto an image holding body (not shown), and outputs a drive signal 6 to a bias controller 7. The bias controller 7 outputs a bias signal 8 to a high voltage unit for transfer/development, and the like, of data according to the drive signal, develops the electrostatic latent image, and transfers the developed image onto a recording paper, thereby forming a multicolor image.

In a print sequence controller 83, a print sequence procedure for performing a process in association with the detection of open/close information of a door (not shown) in the image forming apparatus 2 and the normal printing operation is transferred to the image forming apparatus 2. Information of an engine at the time of image formation is reported as a status to the printer controller 11 from an informing unit 81 through a video interface 18.

The operation between the printer controller circuit 1 and printer controller 11 will now be described with reference to FIG. 7 and FIGS. 8A and 8B. FIG. 7 shows an example of timing charts for interface signal lines for connecting the printer controller circuit 1 and printer controller 11. FIGS. 8A and 8B show examples of timing charts for command timings and status timings, respectively.

In FIG. 7, after the power supply is turned on, the printer controller circuit 1 makes a /PPRDY signal 21 true at a time point when communication with the printer controller 11 is enabled. After it is confirmed that a /CPRDY signal 23 from the printer controller 11 is true, when it is recognized that a proper ID code is received from the printer controller 11, the image forming apparatus 2 starts a process for setting a printable state. When the apparatus enters the printable state, a /RDY signal 22 is made true.

At a time point when the communication is possible, as shown in FIG. 8B, the printer controller 11 makes the /CPRDY signal 23 true and makes a /CBSY signal 24 true. After that, the printer controller transmits a CMD signal 25 synchronously with a pulse from a CCLK signal 26. After a command from the CMD signal 25 is transmitted, a CBSY signal 24 is made false.

When the command is received by the above procedure, the printer controller circuit 1 makes an SBSY signal 27 true and, after that, transmits an STS signal 28 synchronously with the pulse from the CCLK signal 26. After the status by the STS signal 28 is sent, the SBSY signal 27 is made false. By the above procedure, the printer controller circuit 1 and printer controller 11 executes transmission and reception of the command and status.

A procedure for the printing operation will now be described.

The printer controller 11 makes a /PRNT signal 29 true after confirming that the /RDY signal 22 is true.

When it is confirmed that the /PRNT signal 29 is trues as shown in FIG. 8A, the printer controller circuit 1 starts the pre-rotating operation of an electrophotographing process. After a reference signal (not shown) is detected, the printer controller circuit 1 generates a pulse of a TOP signal 30 after the elapse of time t1. The printer controller 11 generates a yellow image signal /VDo 32 synchronously with a pulse of an LSYNC signal 33. By similar means, image signals of magenta, cyan, and black are outputted, thereby forming a multicolor image.

FIG. 9 is a flowchart showing the printing operation sequence in the printer engine of the image forming apparatus, and will be sequentially described hereinbelow in accordance with the processing steps in the diagram.

When the power supply is turned on, an initial setting of a hardware circuit and communication is performed. After that, the apparatus enters a state of waiting for a proper ID command from the printer controller (step S10). When it is determined that the proper ID command is received, the processing routine advances to step S11 and initial processes, for example, leading processes such as checking for the presence or absence of a developer, starting of adjustment of a temperature of a fixing heater, initialization of a driving system, and the like, are executed until a standby state in which the printing operation is enabled. At this time, however, when a failure is detected by the self diagnosis, the processing routine advances to a failure routine.

The apparatus waits for the standby state, which is a state in which a fixing temperature reaches a target temperature or the like (step S12), thus enabling the apparatus to "stand by" to be ready to execute a printing operation, as discussed above. When the apparatus enters the standby state, paper presence/absence information from paper presence/absence detecting means (not shown) is checked (step S13). If paper is present, step S14 follows. If no paper exists, step S12 follows.

In step S14, the presence or absence of a print instruction from the printer controller is discriminated (a check is made to see if the /PRNT signal is true). If there is a print instruction, a print sequence of the electrophotographing process is executed (step S15) and an optimum image is outputted. When the printing operation is finished (step S16), a process to return to the standby state is executed and the operations from step S12 are repeated.

When the power supply is turned on, unless the reception of the proper ID command is confirmed, the printer engine does not execute the operation (prevention of abuse by forgery printer controller).

When an error occurs in the print image, it is necessary for the service person, and the like, to remove the printer controller, to perform the printing operation, and to discriminate whether the error occurred due to the engine or the controller. In the printer engine, as mentioned above, for this purpose, a special tool to skip the step of discriminating the reception of the ID command is attached to the printer engine, thereby enabling execution of an engine test print.

However, the service person executes services and adjustments of a plurality of business machines and, when he does not have the above special tool, he cannot make the printer engine operative and has to again visit the user. This deteriorates the service adjusting performance of the service person and increases costs.

SUMMARY OF THE INVENTION

It is an object of the invention to provide means for solving the foregoing problems.

For this purpose, according to the invention, the above object is accomplished by providing an image forming apparatus for any one of the following items (1) to (3).

(1) An image forming apparatus for forming a latent image onto an image holding body and visualizing the latent image, thereby forming a multicolor image, comprising: a receiver for receiving a command from a printer controller; an attachment checker for checking an attachment situation of a printer controller board; and a print sequence switch for switching a print sequence on the basis of information from the checker.

(2) In the image forming apparatus according to the above item (1), the attachment checker is a checker for checking whether a power supply is turned on and for continuing the discrimination of the presence or absence of the attachment until the power supply is turned off.

(3) In the image forming apparatus according to the above item (1) or (2), the switch switches the print sequence on the basis of the information from the attachment checker, continues the print sequence until the power supply is turned off, when it is determined that a printer controller exists, selects a conventional print sequence, namely, a print sequence for performing the operation only by the reception of a specific command according to an initial procedure by the receiver, and, when it is decided that the printer controller is not attached, selects a print sequence such that although the operation is executed irrespective of the reception of the command, only an engine test print is performed upon printing.

With the construction of the invention as mentioned above, the attachment situation of the printer controller is checked at the time of "power-on" by an attaching situation checker for checking an attachment situation of a printer controller board. When the printer controller exists, the operation is executed in a manner similar to the conventional one. When the printer controller is not attached, the ID check is skipped and the operation is performed. However, for the purpose of preventing abuse by a forgery printer controller, by enabling only the engine test print by the engine test print switch, even if the service person does not have the special tool to adjust the engine, the check by the test print can be performed. Thus the service adjusting performance of a service person can be improved, and an increase in costs due to re-visits can be prevented.

The above and other objects and features of the present invention will become apparent from the following detailed description and the appended claims, with reference to the accompanying drawings.

BRIEF DESCRIPTION OF THE DRAWINGS

FIG. 7 is a connection diagram of a video interface for connecting a printer controller circuit and a printer controller;

FIGS. 8A and 8B are examples of timing charts for explaining a communicating method of the video interface; and FIG. 9 is a flowchart for a conventional printing operation sequence.

DETAILED DESCRIPTION OF THE PREFERRED EMBODIMENT

A preferred embodiment of the invention will now be described hereinbelow with reference to the drawings.

Figure 1:
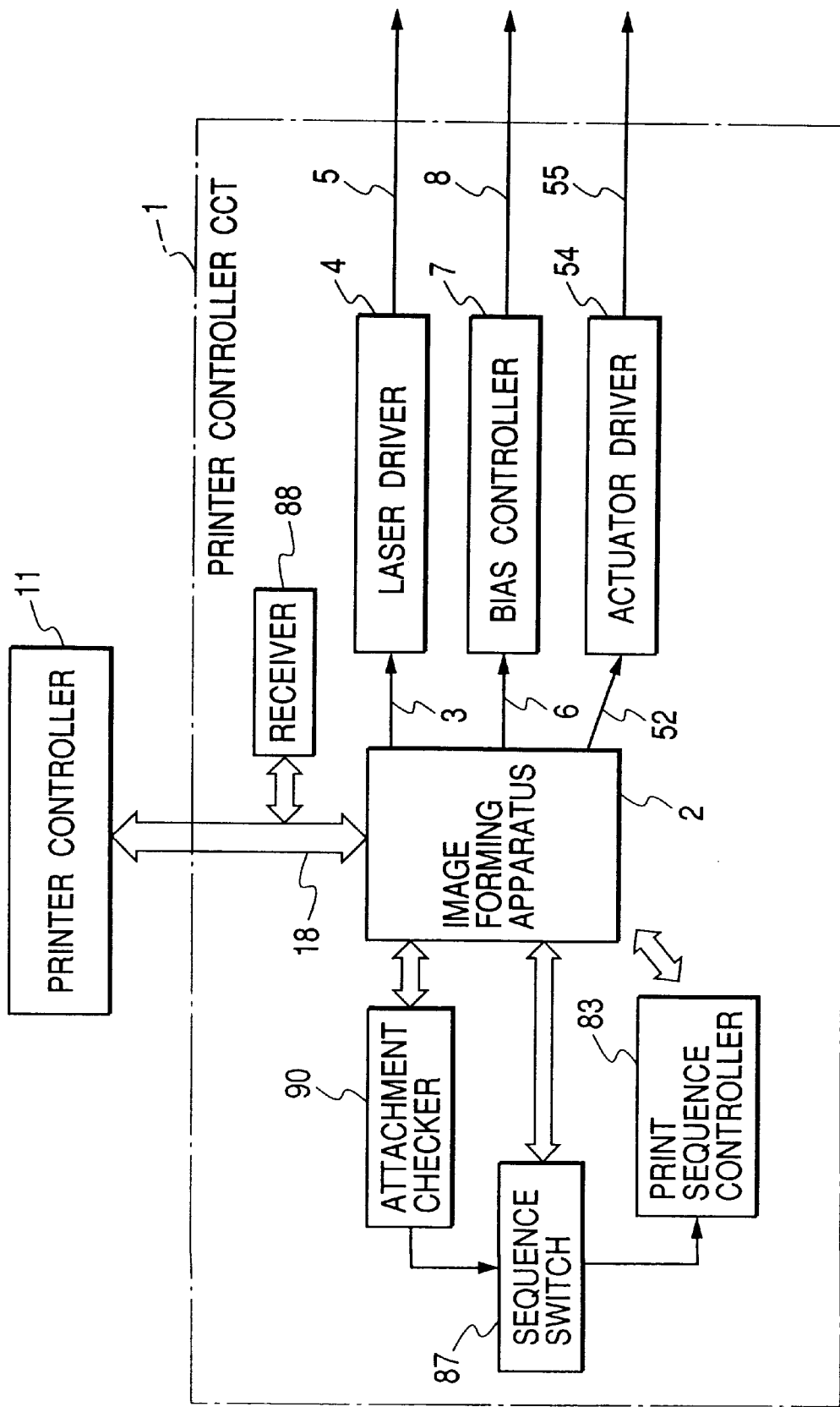
FIG. 1 is a block diagram of a printer control mechanism of an image forming apparatus according to a first embodiment of the present invention.
Figure 6:
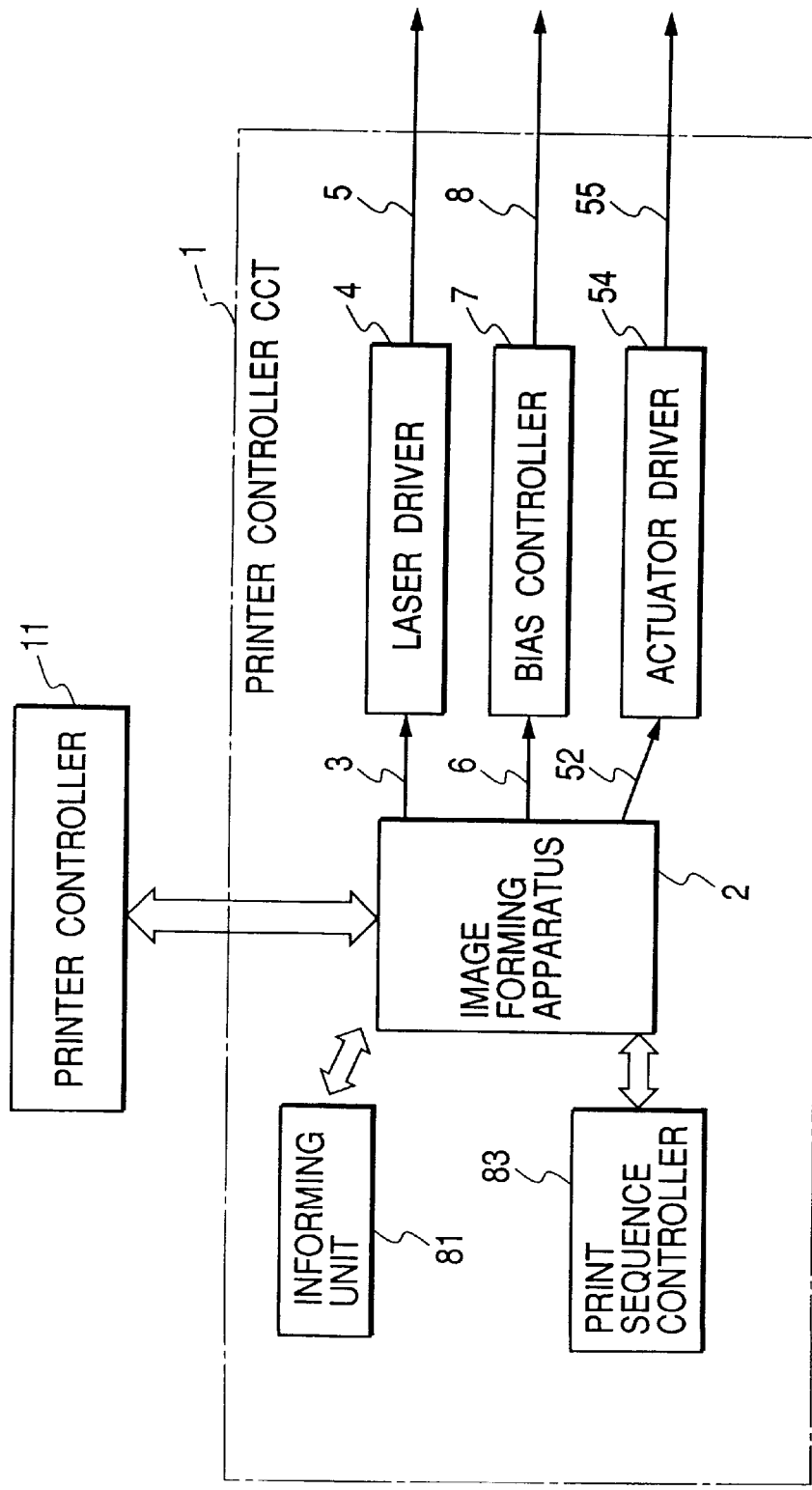
FIG. 6 is a block diagram for explaining the printer control mechanism of an example of the image forming apparatus.

FIG. 1 shows a block diagram for explaining a printer control mechanism of an image forming apparatus showing a first embodiment of the invention. The component elements similar to those in FIG. 6 are designated by the same reference numerals and their overlapped descriptions are omitted here. The operation between the printer controller circuit 1 and printer controller 11 is similar to that in the example shown in FIGS. 7, 8A, and 8B.

When the power supply is turned on, the printer controller circuit 1 executes initialization processes of the image forming apparatus 2, such as turning off an output port connected to the image forming apparatus 2, checking for an abnormality at an input port of a sensor, and the like. After that, whether the printer controller 11 has been attached or not is discriminated by an attachment checker 90. When the presence of the attachment of the apparatus is recognized, an operation status of the printer is reported to the printer controller 11 through the video interface signal 18 and a receiver 88. Whether the specific command from the printer controller 11 has been received or not is discriminated. After a normal reception is confirmed, an initial process of a desired electrophotographing process is executed.

At a time point when all of the processes are finished, the apparatus waits for a true signal of /PRNT. When the true signal of /PRNT is detected, the printing operation is performed by a print sequence controller 83. After that, the printing operation is executed at the operation timing described for the conventional example.

For the first embodiment of the invention, processes in the case where the engine test print is executed without using the service tool and the controller will now be described.

The attachment checker 90 is means for checking the attachment situation of the printer controller board. There are two cases: where the presence or absence of the /CPRDY signal from the printer controller 11 is discriminated, and the presence of the attachment of the apparatus is determined; and where, as shown in the embodiment, the specific input port is checked irrespective of the presence or absence of the attachment of the actual controller, and the absence of the attachment is decided. The receiver 88 is means for discriminating whether the specific command and command data from the printer controller 11 have been received or not.

A sequence switch 87 is means for switching a mode to execute a print sequence based on the image data from the printer controller 11 and a mode to execute an engine test print sequence provided in the engine in accordance with the condition discriminated by the attachment checker 90.

A processing sequence in the attachment checker 90, a processing sequence in the receiver 88, and a processing sequence in the print sequence controller 83 will now be sequentially described with reference to the flowcharts of FIGS. 2, 3, and 4, respectively.

Figure 2:
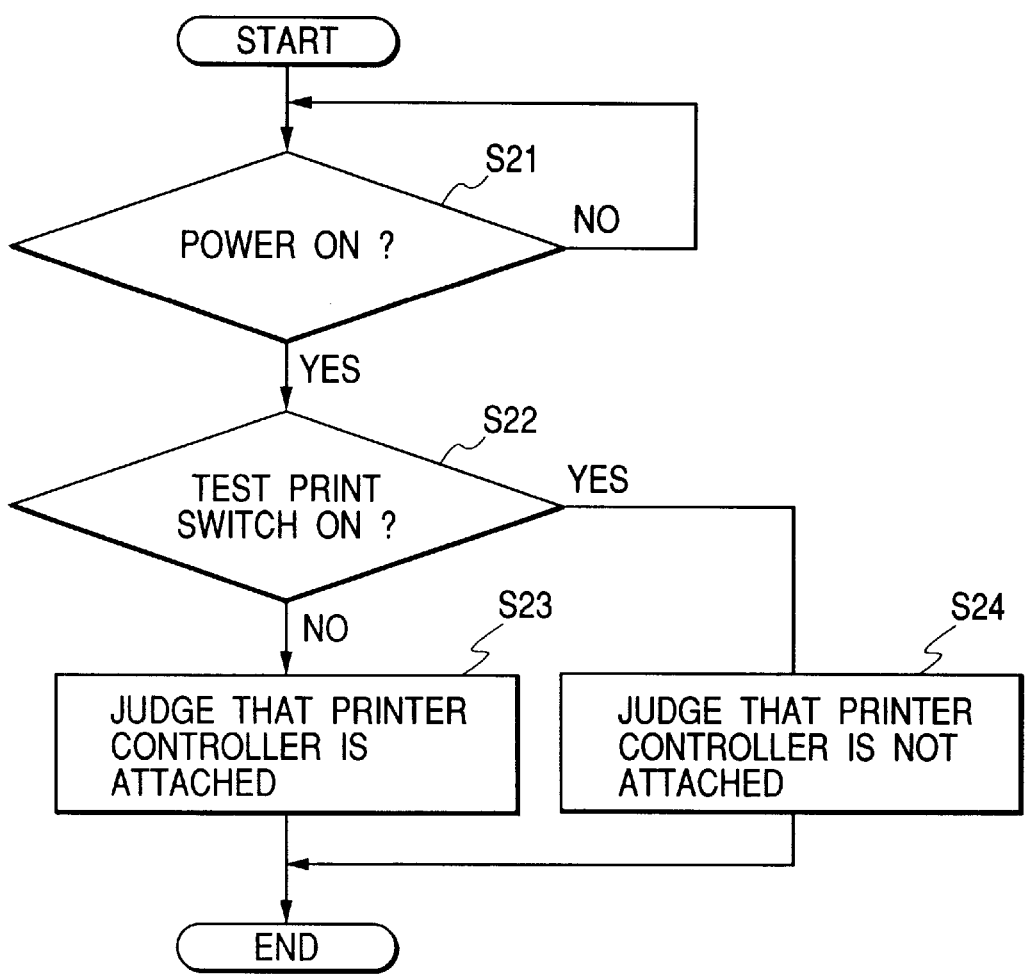
FIG. 2 is a processing sequence flowchart for the attachment checker in FIG. 1.

As shown in FIG. 2, when the power supply is turned on (step S21), the attachment checker 90 discriminates whether a test print switch is ON or not in step S22. In this case, the service person forcedly determines the absence of the controller irrespective of the presence or absence of the attachment of the actual printer controller 11. If YES, it is determined that the printer controller is not attached (step S24). If NO, it is decided that the printer controller has been attached (step S23).

Figure 3:
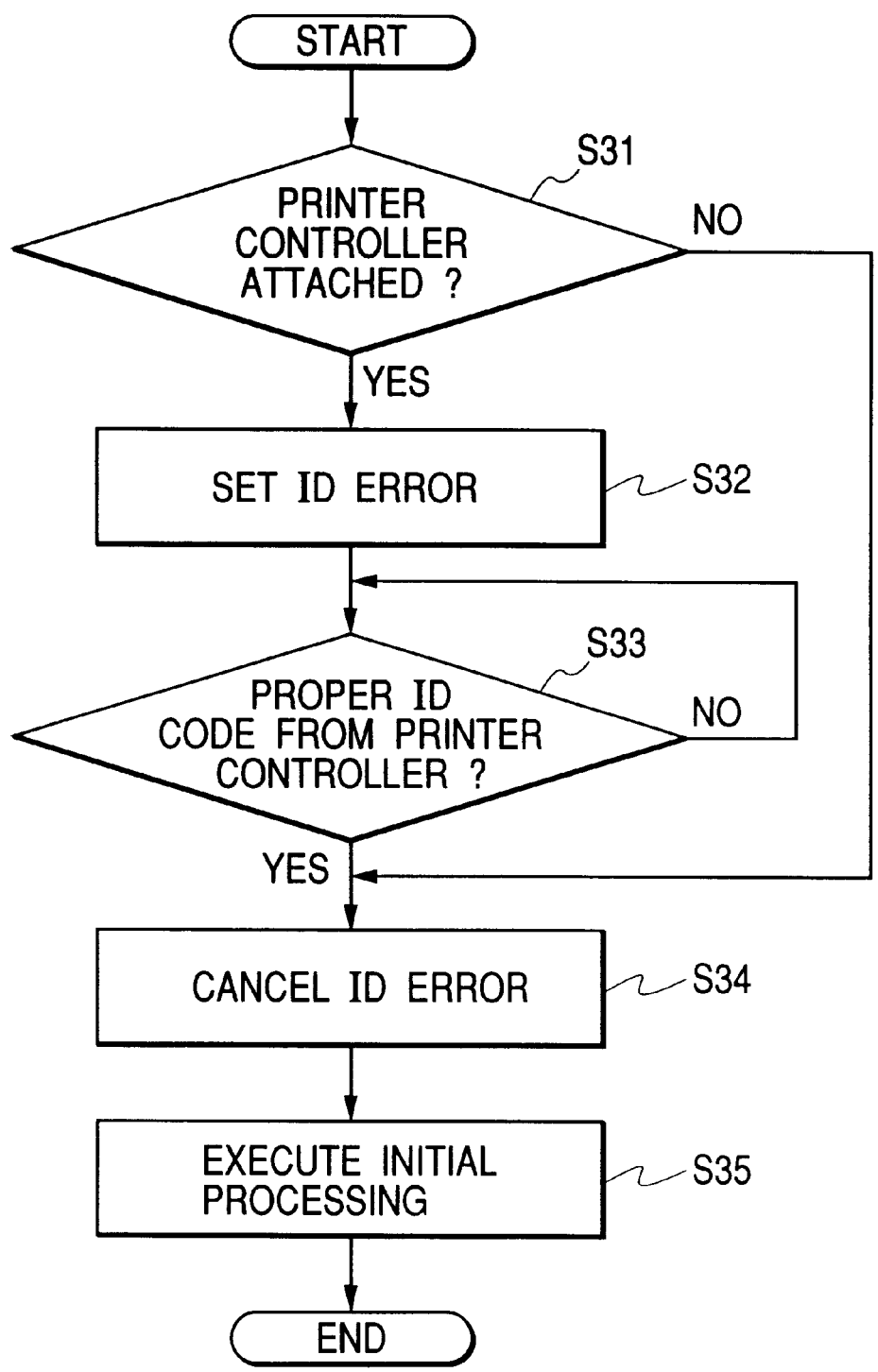
FIG. 3 is a processing sequence flowchart for the receiver in FIG. 1.
Figure 4:
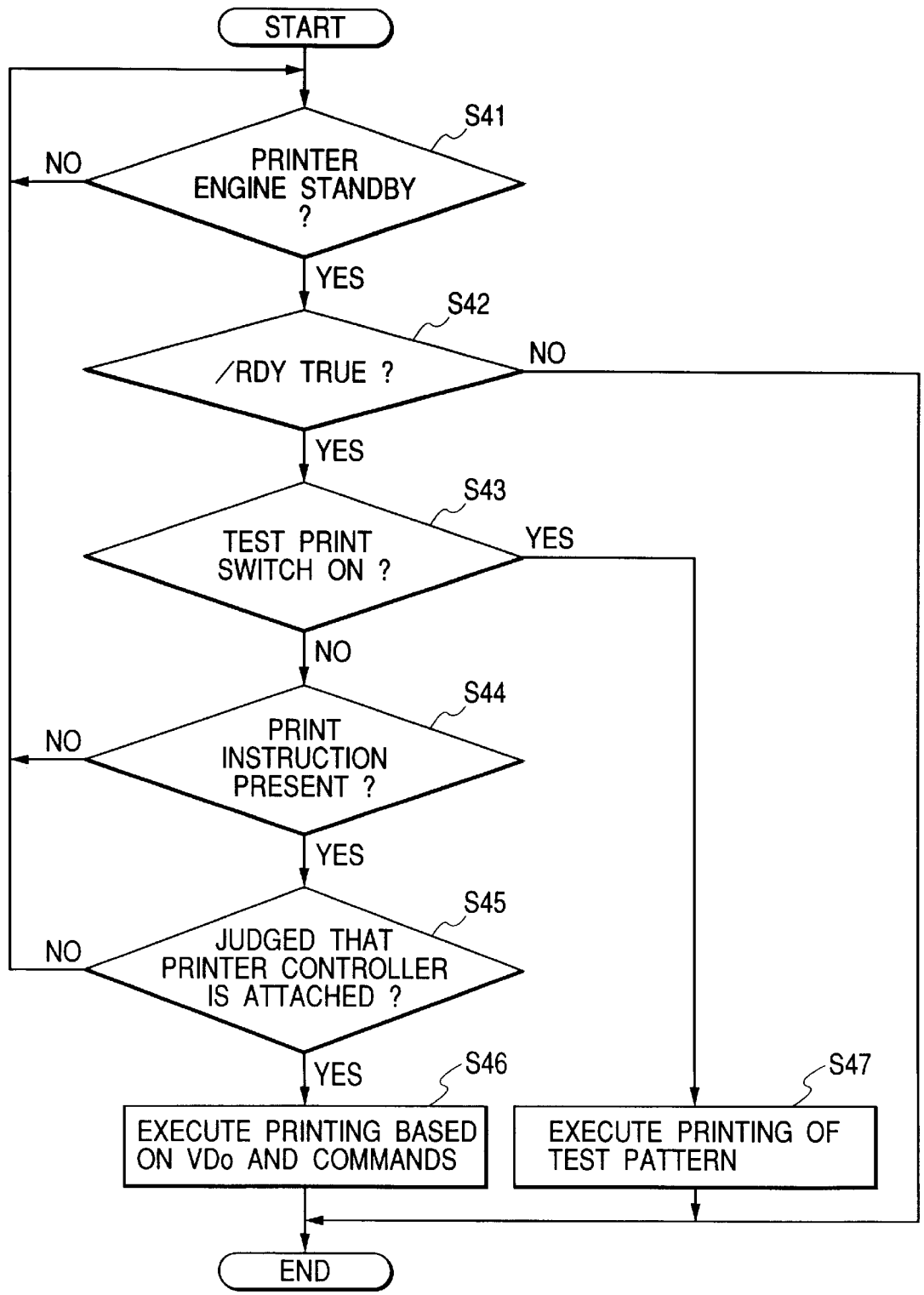
FIG. 4 is a flowchart for a processing sequence of the print sequence controller of FIG. 1.

On the basis of a check result of the attachment checker 90 (step S31), if the printer controller exists, the receiver 88 in FIG. 3 executes steps S32 and S33. If there is no printer controller, steps S32 and S33 are skipped. In steps S32, S33, and S34, the contents of the command from the controller 11 are checked. Only when the proper ID code is received are the initial processes are executed (step S35). If the ID code is improper, an ID error is reported to the printer controller 11 and the initial processes are not executed.

The processing sequence in the print sequence controller 83 will now be described with reference to FIG. 4. First, when the printer engine is in a standby state (step S41) and the /RDY signal is true (step S42), namely, if it is decided that the apparatus is in an always printable state, the processing routine advances to step S43. Whether the test print switch is ON or not is discriminated (step S43). A check is made to see if a print start instruction from the printer controller 11 has been issued (whether the /PRNT signal is true or not is discriminated) (step S44). In step S43, when it is decided that the test print switch is ON (there is the print start instruction), step S47 follows and the printing operation by a test pattern provided in the engine is executed. As for a paper feeding port, a paper ejection port, and a test print pattern image in the test pattern printing mode, when commands to designate them are recognized through the video interface 18, the printing operation is executed in accordance with that information. When such commands are not recognized, the process is performed as a default. For instance, the printing operation is executed by the built-in cassette paper feeding port, main body paper ejection port, and lateral line test pattern.

On the other hand, when it is decided in step S44 that there is the print instruction (/PRNT is true), step S45 follows. When it is decided that the printer controller has been attached as a discrimination result of the attachment checker 90, step S46 follows. The printing operation is executed on the basis of the VDo signal and a command from the printer controller 11. When it is decided that the printer controller is not attached, only the test pattern print caused by the turning on of the test print switch is accepted.

As described above, the attaching situation of the printer controller when the power supply is turned on is discriminated by the attachment checker for checking the attaching situation of the printer controller 11 board.

When the printer controller is attached, the operation is executed as usual. When it is not attached, the ID check is skipped and the operation is performed. By enabling only the engine test print by the engine test print switch in order to prevent abuse by a forgery printer controller, even if the service person does not carry the specific tool for engine adjustment, the check by the test print can be performed. The service adjusting performance of the service person can be improved, and an increase in costs due to re-visits can be prevented.

A second embodiment according to the invention will now be described hereinbelow. A construction (FIG. 1) of the printer controller circuit 1 is similar to that in the first embodiment.

In the first embodiment, the attachment situation of the printer controller 11 when the power supply is turned on is checked and only the printing operation for the test pattern resident in the engine is enabled in accordance with the situation. However, in case of executing a procedure in which the printer engine is made operative by a discrimination result indicative of the absence of the attachment of the printer controller, and, after confirming that the engine is normal, the printing operation is confirmed on the basis of the information from the printer controller 11 or the like, it is necessary to temporarily turn off the power supply. Improvement of the service adjusting performance of a service person and a reduction in service time are deterred.

In the second embodiment, even after actuation of a process caused by a decision indicative of the absence of the attachment of the printer controller, by operating a specific input port using the specific adjusting tool, for example, a jumper line or the like, the control mode is forcedly changed to a mode indicative of the presence of the attachment of the printer controller, thereby enabling a printing operation initiated by an instruction from the printer controller 11 to be performed.

Figure 5:
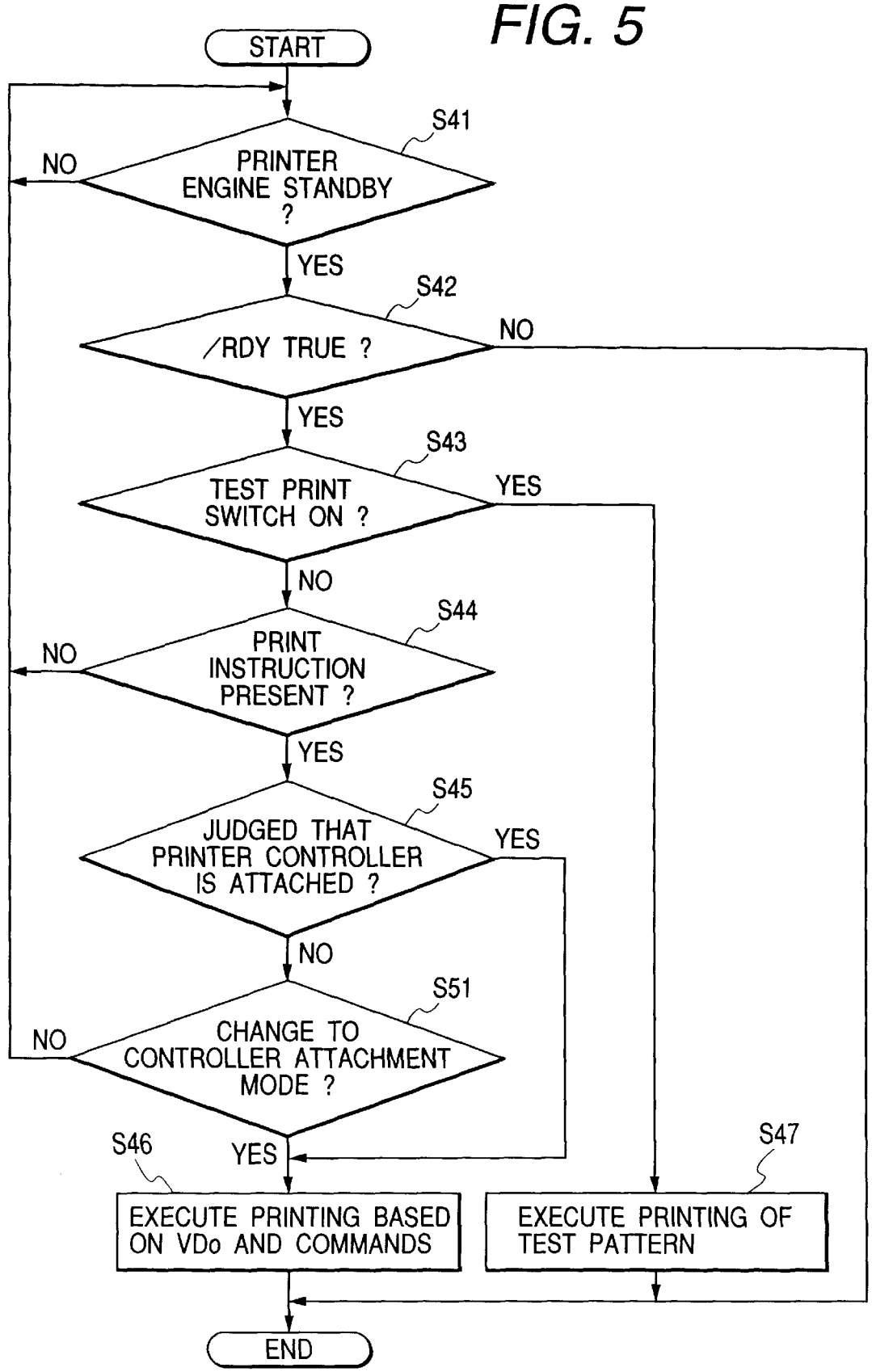
FIG. 5 is a flowchart for the processing sequence of the sequence switch of the invention.

FIG. 5 shows a processing sequence flowchart of the print sequence controller 83 in the second embodiment. The same processing steps S41 to S47 as those described in FIG. 4 are executed (the overlapped description is omitted here). A process in step S51, namely, a process to discriminate whether or not the control mode is forcedly changed to the mode indicative of the presence of the attachment of the printer controller by the adjusting tool is executed between steps S45 and S46. If the mode is changed, the processing routine advances to step S46.

With the above construction, the service adjusting performance of a service person can be further improved and the service time can be further reduced.

The present invention is not limited to the foregoing embodiments, and many modifications and variations are possible within the spirit and scope of the appended claims of the invention.

What is claimed is:

1. An image forming apparatus for forming a latent image onto an image holding body, visualizing said latent image, and forming an image, comprising:

image forming means for performing image formation based on an image signal corresponding to the image;

receiving means for receiving a command from a printer controller;

checking means, for checking an attachment situation of said printer controller; and print sequence switching means for switching a print sequence used for printing the image based on information from said checking means.

2. An apparatus according to claim 1, wherein said checking means checks whether a power supply is turned on and holds a check result until the power supply is turned off.

3. An apparatus according to claim 1, wherein when the attachment situation of the printer controller is checked by said checking means, said print sequence switching means selects a print sequence including a reception check of a specific command by said receiving means, and, when the attachment situation of the printer controller is not checked, said print sequence switching means selects a print sequence for a test print.

4. An apparatus according to claim 1, wherein said image forming apparatus performs color image formation.

5. An apparatus according to claim 1, wherein said image forming apparatus forms an image by using an electrophotographic process.

6. An image forming apparatus for forming an image based on an image signal from an image signal generating apparatus by being connected to the image signal generating apparatus, comprising:
  image forming means for performing image formation based on the image signal from the image signal generating apparatus;
  discriminating means for discriminating whether or not predetermined identification data has been outputted from the image signal generating apparatus;
  first control means for inhibiting or permitting the image formation based on the image signal from the image signal generating apparatus in accordance with a discrimination result from said discriminating means; and
  second control means for permitting the image formation based on an image signal generated by said image forming apparatus in a case where the predetermined identification data is not received.

7. An apparatus according to claim 6, further comprising second discriminating means for discriminating whether or not said image signal generating apparatus has been connected, and wherein said second control means permits the image formation based on the image signal generated by said image forming apparatus in a case where it is determined by said second discriminating means that the image signal generating apparatus is not connected.

8. An apparatus according to claim 6, wherein the image signal generated by said image forming apparatus is a test pattern.

9. An apparatus according to claim 6, wherein said image forming apparatus forms a color image.

10. An apparatus according to claim 6, wherein said image forming apparatus forms the image by using an electrophotographic process.

11. A method of controlling an image forming apparatus for forming an image based on an image signal from an image signal generating apparatus by being connected to the image signal generating apparatus, comprising the steps of:
  discriminating whether or not predetermined identification data has been outputted from the image signal generating apparatus;
  inhibiting or permitting the image formation based on the image signal from the image signal generating apparatus in accordance with a discrimination result in said discriminating step; and
  permitting the image formation based on the image signal generated by the image forming apparatus in a case where the predetermined identification data is not received.

12. A method according to claim 11, further comprising a second discriminating step of discriminating whether or not the image signal generating apparatus has been connected, and wherein the image formation based on the image signal generated by the image forming apparatus is permitted in said second permitting step in a case where it is determined by said second discriminating step that the image signal generating apparatus is not connected.

13. A method according to claim 11, wherein the image signal generated by the image forming apparatus is a test pattern.

14. A method according to claim 11, wherein the image forming apparatus forms a color image.

15. A method according to claim 11, wherein the image forming apparatus forms an image by using an electrophotographic process.

16. An image forming apparatus comprising:
  image forming means for performing image formation based on an image signal received from an image signal generating apparatus or based on an image signal generated by said image forming apparatus;
  discriminating means for discriminating, in response to power supplied to said image forming apparatus, whether or not the image signal generating apparatus is connected to said image forming apparatus; and
  control means for permitting said image forming means to perform the image formation based on the image signal generated by said image forming apparatus, without supplying power to said image forming apparatus again, even if said discriminating means discriminates that the image signal generating means is not connected to said image forming apparatus.

17. An apparatus according to claim 16, further comprising second control means for inhibiting said image forming means from performing the image formation when predetermined information is not received from the image signal generating apparatus even if said discriminating means discriminates that the image signal generating apparatus is connected to said image forming apparatus.

18. An apparatus according to claim 16, wherein the image signal generated by said image forming apparatus is a test pattern.

19. An apparatus according to claim 16, wherein said image forming means performs color image formation.

20. An apparatus according to claim 16, wherein said image forming means performs the image formation by using an electrophotographic process.

21. An image forming method comprising the steps of:
  performing, using image forming means, image formation based on an image signal received from an image signal generating apparatus or based on an image signal generated by an image forming apparatus;
  discriminating, in response to power supplied to the image forming apparatus, whether or not the image signal generating apparatus is connected to the image forming apparatus; and
  permitting the image formation based on the image signal generated by the image forming apparatus, without supplying power to said image forming apparatus again, even if said discriminating step discriminates that the image signal generating means is not connected to the image forming apparatus.

22. A method according to claim 21, further comprising the step of inhibiting the image formation when predetermined information is not received from the image signal generating apparatus even if said discriminating step discriminates that the image signal generating apparatus is connected to the image forming apparatus.

23. A method according to claim 21, wherein the image signal generated by the image forming apparatus is a test pattern.

24. A method according to claim 21, further comprising the step of performing color image formation.

25. A method according to claim 21, wherein the step of performing uses an electrophotographic process for the image formation.

* * * * *

UNITED STATES PATENT AND TRADEMARK OFFICE
CERTIFICATE OF CORRECTION

PATENT NO.   : 6,072,965
DATED        : June 6, 2000
INVENTOR(S)  : Fumihiro Ueno It is certified that error appears in the above-identified patent and that said Letters Patent is hereby corrected as shown below:

COLUMN 2

Line 13, "trues" should read --true,--.

COLUMN 5

Line 25, "are" should be deleted.

COLUMN 8

Line 52, "method" should read --method according--.

Signed and Sealed this

Twelfth Day of June, 2001

*Attest:*

NICHOLAS P. GODICI
*Attesting Officer*   *Acting Director of the United States Patent and Trademark Office*